United States Patent [19]
Cull et al.

[11] 3,846,536
[45] Nov. 5, 1974

[54] REGENERATION PROCESS FOR FLUE GAS SORBENT

[75] Inventors: Neville L. Cull, Baker; Darius B. Vohsberg, Baton Rouge, both of La.

[73] Assignee: Esso Research and Engineering Company, Linden, N.J.

[22] Filed: Sept. 7, 1972

[21] Appl. No.: 286,941

[52] U.S. Cl. .................................. 423/244
[51] Int. Cl. .......... B01j 9/04, B01j 9/15, B01j 9/16, B01j/9/08, B01j 9/20, C01b 17/00
[58] Field of Search ........................... 423/242–244

[56] References Cited
UNITED STATES PATENTS
3,495,941   2/1970   Van Helden et al. ................ 423/244

FOREIGN PATENTS OR APPLICATIONS
790,945   7/1968   Canada .............................. 423/244
749,940   1/1967   Canada .............................. 423/244

Primary Examiner—Oscar R. Vertiz
Assistant Examiner—Gregory A. Heller

[57] ABSTRACT

A dry solid sorbent used in cyclic regenerative processes for removing sulfur dioxide from waste gas streams is regenerated with a lower aliphatic alcohol such as methanol. Copper oxide supported on a high surface area alumina is a preferred sorbent which can be regenerated in this manner. Preferred regeneration temperatures are about 600°–900°F.

9 Claims, No Drawings

REGENERATION PROCESS FOR FLUE GAS SORBENT

BACKGROUND OF THE INVENTION

This invention relates to processes for removing sulfur dioxide from waste gas streams such as flue gas in a cyclic regenerative process using a dry solid sorbent, and more particularly to processes for regenerating the sorbent.

Sulfur dioxide is an atmospheric pollutant, and its removal from waste gas streams has received considerable attention in recent years. The combustion of sulfur containing fossil fuels such as coal and oil is the principal source of sulfur dioxide emissions, and a substantial portion of this amount is accounted for by flue gas from electric power plants. Sulfuric acid plants and smelter gases are other sources of sulfur dioxide pollution.

The removal of sulfur dioxide from a waste gas such as flue gas in a cyclic regenerative process at elevated temperature using a dry solid sorbent is known. See, for example, British Pat. Nos. 1,089,716 and 1,154,009, and U.S. Pat. No. 3,501,897. These references disclose processes in which a gas containing both oxygen and sulfur dioxide, such as flue gas, is contacted with a solid sorbent or acceptor at elevated temperatures, followed by regeneration of the sorbent with a reducing gas. Copper oxide supported on alumina is disclosed in British Pat. No. 1,089,716 and in U.S. Pat. No. 3,501,897; an accepter comprising potassium oxide and vanadium pentoxide on a carrier is described in British Pat. No. 1,154,009 and in U.S. Pat. No. 3,501,897. Reducing gases suitable for sorbent regeneration according to these references include hydrogen, carbon monoxide, mixtures of these, and low molecular weight hydrocarbons such as methane, ethane, propane and butane.

A major disadvantage of hydrogen, carbon monoxide and low molecular weight hydrocarbons as regenerating agents is that these materials are gases. Hydrogen and carbon monoxide either require large volumes for storage or else must be generated on-site. Some storage facilities would probably be necessary even when these gases are generated on-site. On-site gas generation is particularly undesirable in the case of medium-sized and small power plants, in view of the heavy capital investment involved. Furthermore, some safety hazard is involved in hydrogen generation. Ethane, propane and butane are gases at ordinary temperatures and pressures and therefore must be stored under pressure, requiring costly refrigeration and presenting some risks. Methane is available as natural gas at comparatively low cost in some localities; however, methane is less active than the other regenerants and may not be preferred even when readily available.

SUMMARY OF THE INVENTION

It has now been found according to this invention that solid flue gas desulfurization sorbents, such as copper oxide on alumina, can be regenerated using a lower aliphatic alcohol such as methanol. Regeneration temperatures are ordinarily in the range of about 600° to about 900°F. and preferably from about 650° to about 800°F.

DESCRIPTION OF THE PREFERRED EMBODIMENT

The regenerating agents of the present invention are lower aliphatic alcohols containing from one to about six carbon atoms. Methanol is a preferred alcohol according to the present process, but other lower aliphatic alcohols containing up to about six carbon atoms, e.g., ethanol, isopropyl alcohol, normal propyl alcohol, the isomeric butyl alcohols, the pentyl alcohols, ethylene glycol, etc., can be used. Isopropyl alsohol is also a particularly attractive regenerating agent because of its low cost. Either a single alcohol or a mixture of alcohols can be used. These alcohols are used in the vapor phase. These alcohols can be used either undiluted or diluted with an essentially inert gas such as steam. The regenerating gas (or gas mixture where a diluent is used) in vapor form is contacted with the spent sorbent, as for example by passing the alcohol vapor through a bed of the sorbent, at a suitable regeneration temperature.

The improved regeneration process of the present invention is intended for use in cyclic regenerative flue gas desulfurization processes such as those disclosed in British Pat. Nos. 1,089,716 and 1,154,009, and U.S. Pat. No. 3,501,897, supra. A typical operating cycle includes a sorption (or desulfurization) cycle and a regeneration cycle, and may also include purges with an inert gas, such as steam, following both the sorption and regeneration cycles.

The desulfurization cycle can be carried out using conditions which are known in the art. During this cycle, flue gas or other waste gas is contacted with a solid sorbent at an inlet temperature which is generally from about 600° to about 1,000°F. and at a space velocity in the range of about 1,000 to about 10,000 v./v./hr. The preferred temperature range varies slightly from sorbent to sorbent. The sorbent is preferably in the form of a fixed bed. The reactor may be of any suitable deisgn; a tubular reactor is preferred.

Assuming, for purposes of illustration, that the sorbent material is copper oxide on alumina (which is a preferred flue gas desulfurization sorbent), the copper will ordinarily be entirely or primarily in the form of metallic copper at the beginning of the desulfurization cycle. The oxygen in flue gas oxides the copper quantitatively to copper oxide. The sulfur dioxide in the flue gas reacts with part of this copper oxide to form copper sulfate, and flue gas of greatly reduced sulfur content is discharged from the reactor. When the amount of $SO_2$ in the effluent gas reaches a predetermined level, e.g., 10 percent of the amount of $SO_2$ in the entering gas (amounts refer to cumulative amounts measured over a whole operating cycle), the desulfurization cycle is stopped and the sorbent is regenerated.

A typical flue gas which can be desulfurized according to this invention contains some molecular oxygen, e.g., about 0.5 to 5 percent by volume, and more usually about 1 to 4 percent by volume, due to the use of excess air in combustion, and about 0.1 to about 0.5 percent and more usually about 0.2 to 0.3 percent by volume of $SO_2$. Nitrogen, carbon dioxide and water vapor represent the principal constituents of the flue gas. This analysis is given for purposes of illustration only, since the present process is generally applicable to the treatment of gases containing both sulfur dioxide and oxygen in order to remove the former.

The sorbent is a solid material which is selective for the removal of $SO_2$ from gas mixtures. Copper oxide supported on a high surface area alumina (i.e., gamma alumina) is the preferred sorbent for use in the present invention. However, other active materials which can be sulfated under oxidizing conditions, such as potassium oxide-vanadium pentoxide previously mentioned, can also be used in this invention. The carrier material has a high surface area, preferably over about 100 square meters per gram. Besides alumina, other carrier materials such as silica-alumina and silica, can be used. The choice of carrier material is governed to a large extent by the choice of active material; thus, copper oxide on alumina is considerably more effective than copper oxide on silica as known in the art. This sorbent is partially sulfated at the beginning of the regeneration cycle. Thus, a supported oxide sorbent will include both copper sulfate and copper oxide.

Suitable regeneration temperatures are generally in the range of about 600° to 1,000°F.; these temperatures will vary slightly from sorbent to sorbent. Regeneration space velocities are generally in the range of about 200 to about 2,000 v./v./hr. In the case of copper oxide on alumina, regeneration with an alcohol according to this invention is carried out at a gas inlet temperature of about 600° to about 900°F., preferably about 650° to about 850°F. This sorbent, which is partially sulfated at the beginning of the regeneration cycle (e.g., a mixture of copper oxide and copper sulfate), is restored to its original form. In the case of copper sorbents, it appears that most of the copper is reduced to metallic copper, although a portion may be present as copper oxide at the end of a regeneration cycle. Formation of undesired by-products, such as copper sulfide, is minimized by the use of alcohols as regenerants.

A regeneration off-gas containing sulfur dioxide in substantially greater concentration than the concentration of $SO_2$ in flue gas is obtained. Typical $SO_2$ off-gas concentrations are about 5 percent to about 20 percent by volume. The $SO_2$ content of the off gas can be converted to sulfur or sulfuric acid.

The alcohol is oxidized during the regeneration process. The chemistry of alcohol oxidation during the regeneration process has not been determined; hence, it is not possible to state the theoretical amount of alcohol necessary to desorb one mole of sulfur dioxide. However, it has been found experimentally that one mole of sulfur dioxide can be desorbed using fewer moles of methanol than hydrogen under comparable conditions. For example, in two series of runs conducted under comparable conditions, it was found that about 2.9–3.0 moles of methanol were required to desorb one mole of $SO_2$, while under comparable conditions, about 3.9 moles of hydrogen were required to desorb one mole of $SO_2$.

It appears that a slight improvement in sorbent activity is obtained using methanol (or other $C_1$–$C_6$ lower aliphatic alcohol) instead of hydrogen. In the two series of runs above mentioned, the percentage of copper sulfated during the sulfation cycles was approximately the same with both methanol and hydrogen; however, a slightly lower $SO_2$ content in the effluent gas at breakthrough was observed in the case of methanol. This means that, at equal $SO_2$ effluent quantities, a slightly higher percentage of the copper would be sulfated when methanol is used for regeneration. While methanol appears to be slightly more efficient than the other lower aliphatic alcohols, such as isopropanol, good sorbent regeneration is achieved with the other alcohols containing up to about six carbon atoms.

Part of the alcohol may pass unconverted into the regeneration off gas. In this case, unconverted alcohol in the regeneration off gas can be condensed and recycled to the regeneration stage.

The use of a lower aliphatic alcohol instead of a gas for regeneration is highly desirable for several reasons. First, the alcohols, because they are liquid at normal temperature and pressure, can be stored in a comparatively small space at atmospheric pressure. This avoids the capital cost of a gas generating plant or the use of high pressure, high volume gas storage facilities. This gives a tremendous reduction in capital costs and in on-site space requirements, which is particularly significant for small and medium sized electric power generating plants. The use of alcohol rather than hydrogen is also advantageous in terms of operating costs in small and medium sized plants, despite the higher costs of the alcohol as compared to the usual gases. A further advantage of the alcohols is greater safety. The alcohols do not form explosive mixtures as readily as the usual reducing gases. Also, the risks attendant in hydrogen generation, or in the storage of low molecular weight hydrocarbons under pressure, are avoided A further advantage of an alcohol regenerant is that unconverted alcohol in the regeneration off gas can be condensed and recycled, while it is usually not possible or at least not practical to separate gases such as hydrogen from a regeneration off gas.

This invention will now be described further with reference to specific examples.

EXAMPLE 1

This example shows that methanol effectively converts copper sulfate on alumina to copper oxide and/or copper with the evolution of sulfur dioxide. A series of once-through runs, with a sorbent as copper sulfate on alumina at the beginning of each run, simulating a spent flue gas desulfurization sorbent containing a mixture of copper sulfate and copper oxide on alumina, are described.

Copper sulfate on alumina sorbent was prepared as follows: 345 g. of 10–20 mesh alumina (surface area 164 $m^2$/g; pore volume 0.70 cc/g), after calcination for three hours at 1,400°F., was immersed in 220 cc of copper sulfate solution having a concentration of 0.2625 g/cc of $CuSO_4.5H_2O$, which is equivalent to about 0.066 g/cc of Cu. The sorbent particles were dried overnight in air then calcined for 3 hours at 650°F. Copper by analysis was 3.59 percent by weight.

A series of six runs, designated 1-A through 1-F, was carried out. Approximately 20 grams of the above described copper sulfate on alumina sorbent was charged to a 1-inch diameter glass reactor for each run. The reactor was immersed in a sand-bath heater so that very little heat loss occurred. Methanol or a methanol-water mixture was passed through a metering pump at the rate of 0.1 cc/min. and was vaporized. The vapors were fed to the bottom of the reactor and passed upwardly through the sorbent bed. The amount of $SO_2$ desorbed during each run was determined by sorption in standard aqueous caustic solution and titration with acid. In all runs where a methanol-steam mixture was used, the mole ratio of methanol to steam was 30/70. Data and results are given in Table I below.

TABLE I

| Run | 1-A | 1-B | 1-C | 1-D | 1-E | 1-F |
|---|---|---|---|---|---|---|
| Regenerant | $CH_3OH$ | $CH_3OH-H_2O$ | $CH_3OH$ | $CH_3OH-H_2O$ | $CH_3OH$ | $CH_3OH-H_2O$ |
| Temp., °F. | 700 | 700 | 750 | 750 | 800 | 800 |
| $SO_2$ desorbed, mols | 2.8 | 1.3 | 2.2 | 1.6 | 2.0 | 1.5 |
| Mol Ratio $\frac{CH_3OH\ Fed}{SO_2\ Desorbed}$ | 5.9 | 6.7 | 7.6 | 5.2 | 8.3 | 5.6 |

The above data would indicate that, for operations at 750° and 800°F., better utilization of the methanol was obtained when a methanol steam mixture was used.

EXAMPLE 2

This example shows the effect of regeneration time using methanol or methanol-steam mixture as a regenerant.

Five runs, designated 2-A through 2-E, were carried out in this example. Fresh copper sulfate on alumina sorbent, which is prepared as described in Example 1, was charged to the reactor prior to each run. The reactor was the same as in Example 1.

Methanol, or a methanol-steam mixture containing 30 mole percent methanol and 70 mole percent steam, was vaporized and passed through the sorbent bed in the manner described in Example 1. Various regeneration times ranging from 6 to 24 minutes were used in this example, and the flow rates were inversely proportional to the regeneration times, so that the total quantity of regenerant was the same in all five runs. Data and results are shown in Table II below.

The copper oxide on alumina sorbent for this example was prepared as follows: A batch of 10/20 mesh alumina extrudates, weighing 416.4 grams, and having a surface area of 164 sq. meters per gram and a pore volume of 0.70 cc/gram, was calcined for three hours at 1,400°F., and was then impregnated with 265 grams of a copper nitrate solution having a concentration of 0.254 grams of $Cu(NO_3)_2 \cdot 3H_2O$ per gram of solution (corresponding to 0.0667 grams of Cu per gram of solution). The sorbent was air dried, then calcined for 3 hours at 800°F. The copper content by analysis was 3.8 percent by weight.

About 20 grams of the above-described copper oxide on alumina sorbent was charged to a 1-inch diameter tubular glass reactor.

Repeated sorption-regeneration cycles were carried out using this sorbent. During the sorption cycles, a simulated flue gas containing 2,700 ppm of $SO_2$ was passed through the reactor for a length of time required to give approximately 10 percent breakthrough of $SO_2$ into the exit gas (i.e., approximately 90 percent of the

TABLE II

| Run | 2-A | 2-B | 2-C | 2-D | 2-E |
|---|---|---|---|---|---|
| Regenerant | $CH_3OH$ | $CH_3OH$ | $CH_3OH$ | $CH_3OH-H_2O$ | $CH_3OH-H_2O$ |
| Temp., °F. | | | 700 | | |
| Time (Min.) | 6 | 12 | 24 | 6 | 12 |
| Regenerant feed rate, cc/min | 0.11 | 0.055 | 0.028 | 0.11 | 0.055 |
| $SO_2$ desorbed, mols | 2.8 | 3.4 | 2.8 | 1.3 | 4.4 |
| Mol Ratio $\frac{CH_3OH\ Fed}{SO_2\ Desorbed}$ | 5.9 | 5.6 | 5.9 | 6.7 | 3.8 |

The data in Runs 2-A, 2-B and 2-C indicate that regeneration time and space velocity do not play a significant role in the regeneration efficiency, which is measured by the mole ratio of methanol fed to $SO_2$ desorbed, when pure methanol is used as the regenerant. Runs 2-D and 2-E indicate that a significant improvement in regeneration efficiency is achieved at lower space velocities when a methanol-steam mixture is used as the regenerant.

EXAMPLE 3

This example compares a methanol-steam mixture with a hydrogen-steam mixture as a regenerant for a copper oxide on alumina sorbent in a cyclic flue gas desulfurization process.

influent $SO_2$ was sorbed and the remaining 10 percent was in the effluent gas). The sorption space velocity was 6,000 v/v/hr. The sorbent was then regenerated by passing either a methanol-steam mixture (30 mole percent methanol, 70 mole percent steam) or a hydrogen-steam mixture (30 mole percent hydrogen, 70 mole percent steam). Inlet gas temperatures for both flue gas and regeneration gas were the same in any given run. Operating data, including regeneration times and space velocities, and results, for four runs 3-A to 3-D are given in Table III below. Each run consisted of three to five consecutive cycles; data and results represent average values for the run. The copper utilization figure indicates the percentage of copper which is converted from copper oxide to copper sulfate during sorption.

TABLE III

| Run | 3-A | 3-B | 3-C | 3-D |
|---|---|---|---|---|
| Temp., °F. | 650 | 650 | 700 | 700 |
| Cycle Numbers | 12-16 | 17-19 | 2-4 | 5-7 |
| Regenerant | $CH_3OH-H_2O$ | $H_2-H_2O$ | $CH_3OH-H_2O$ | $H_2-H_2O$ |
| Regeneration time (Min.) | 6 | 6 | 6 | 10 |
| Regeneration space velocity, V/Hr./V. | 450 | 400 | 450 | 3500 |
| Mol Ratio Reductant Fed / $SO_2$ Desorbed | 2.9 | 4.5 | 1.3 | 34 |
| Mol Ratio $SO_2$ Desorbed / $SO_2$ Adsorbed | 0.76 | 1.18 | 1.07 | 1.04 |
| Cu Utilization, % | 35 | 36 | 60 | 69 |

The above data indicate no significant difference in sorption efficiency, as indicated by the percentage of copper utilization, whether methanol-steam mixture or hydrogen-steam mixture is used as the regenerant. The advantages of the methanol regenerant, whether undiluted or mixed with steam, have been previously indicated.

EXAMPLE 4

The procedure of Example 3 was carried out except that the regenerant was either a mixture of isopropanol and steam (18 mole percent isopropyl alcohol, 82 mole percent steam) or ethanol-steam (23 mole percent ethanol, 77 mole percent steam) and the regeneration time was 6 minutes in all runs. Data and results for four runs, designated 4-A through 4-D and each representing averages of 3 to 5 consecutive cycles, are given in Table IV below.

TABLE IV

| Run | 4-A | 4-B | 4-C | 4-D |
|---|---|---|---|---|
| Cycles | 16-19 | 20-24 | 13-15 | 25-27 |
| Temp., °F. | 700 | 700 | 750 | 750 |
| Regenerant | $IpOH-H_2O$ | $EtOH-H_2O$ | $IpOH-H_2O$ | $EtOH-H_2O$ |
| Regeneration time (Min.) | 6 | 6 | 6 | 6 |
| Regeneration space velocity, V/Hr./V | 450 | 440 | 450 | 440 |
| Mol Ratio Reductant Fed / $SO_2$ Desorbed | .62 | 1.03 | 0.46 | 0.86 |
| Mol Ratio $SO_2$ Desorbed / $SO_2$ Adsorbed | .96 | 0.86 | 1.09 | 0.95 |
| Cu Utilization, % | 65 | 56 | 72 | 60 |

Comparison of Runs 4-A and 4-B with Runs 3-C and 3-D of Example 3, using flue gas inlet temperatures and regeneration gas inlet temperatures of 700°F. in all cases, indicate that slightly better copper utilization was attained using isopropyl alcohol-steam mixtures rather than methanol-steam mixtures for regeneration, while slightly poorer results were obtained with ethanol-steam mixtures than with methanol-steam mixtures. Data using inlet temperatures of both 700° and 750°F. indicate that somewhat better copper utilization is achieved using isopropanol-steam mixtures rather than ethanol-steam mixtures. However, both isopropanol and ethanol are shown to be efficient materials for regenerating a spent copper oxide on alumina catalyst.

EXAMPLE 5

This example compares results obtained using a methanol-steam regenerant with results obtained using hydrogen-steam regenerant in a cyclic regenerative flue gas desulfurization process. Copper oxide on alumina was used as the sorbent material in all runs.

Alumina Raschig rings (nominal size one-half inch) were calcined for 3 hours at 1,000°F. and were then surface impregnated with aqueous copper nitrate solution as follows: The rings were immersed in $C_6$-oxo alcohol, were then removed from the alcohol and immersed in an aqueous copper nitrate solution (700 grams of $Cu(NO_3)_2 \cdot 3H_2O$ per liter of solution; 184 grams of Cu per liter of solution for 1.75 minutes and were then dried and calcined for 3 hours at 800°F. in air. This gave a surface impregnated copper oxide-on-alumina sorbent, having a uniform depth of impregnation of 0.018 inches (30.6 percent by volume impregnated). Physical data on the alumina base and the impregnated sorbent are given in Table V below.

TABLE V

| | |
|---|---|
| Alumina base: | |
| Length (maximum), in. | 0.609 |
| Length (minimum), in. | 0.453 |
| Length (mean), in. | 0.531 |
| Diameter, outside, in. | 0.530 |
| Diameter, inside, in. | 0.248 |
| Particle density, lb/ft³ | 57.8 |
| Bulk density, lb/ft³ | 31.7 |
| Internal surface area, m²/g | 176 |
| Pore volume (total), cc/g | 0.62 |
| Pore volume (pores < 1000A) | 0.38 |
| Pore Volume (pores > 1000A) | 0.24 |
| Crushing strength (av), lb (PLST) | 11.2 |
| Impregnated sorbent: | |
| Depth of impregnation, in. | 0.018 |
| Vol. % impregnation | 30.6 |
| Wt. %. CuO (on total sorbent) | 1.52 |
| Wt. %. CuO (impregnated portion) | 5.04 |

The pore volume in pores less than 1,000 Angstroms in diameter was determined by the BET (nitrogen adsorption) method, and the pore volume in pores greater than 1,000 Angstroms in diameter was obtained with a mercury porosimeter. Internal surface area was obtained via summation of the BET and mercury porosimeter surface area measurements. The two ends of a particle are not parallel; hence, each particle has a maximum length and a minimim length.

The reactor used in this example was a tubular reactor, 4 feet long and 3 inches inside diameter, surrounded by an electrical heating jacket which was adjusted so that there was substantially no heat input into the reactor or heat loss from the reactor. The reactor had a fixed bed of sorbent, prepared as described in this example, having a volume of 0.1470 cubic feet (approximate depth 36 inches), and containing 0.518 gram atoms of copper in the bed.

The performance of this sorbent was evaluated, first in a series of 15 consecutive cycles using a hydrogen-steam mixture for regeneration, then in a series of 12 consecutive cycles using a methanol-steam mixture for regeneration. In each series of cycles, a simulated flue gas containing 2.5 percent by volume of oxygen, 0.28 percent by volume of $SO_2$, balance nitrogen, was passed downwardly through the sorbent bed at an inlet temperature of 700°F. and a space velocity of 2,000 v/v/hr. for 13 minutes. The reactor was then purged for 0.5 minutes with steam. The sorbent was then regenerated with a mixture of 27 percent by volume of hydrogen and 73 percent by volume of steam in the first series of runs, and with 27 percent by volume of methanol and 73 percent by volume of steam in the second series of runs. The regeneration gas inlet temperature was 700°F. in all runs. Finally, the reactor was purged for 0.5 minutes with steam, and then another desulfurization cycle was carried out.

Table VI below shows the operating data and results, including the percentage breakthrough of $SO_2$, i.e., moles of $SO_2$ in effluent flue gas divided by moles of $SO_2$ in incoming flue gas, the quantity of hydrogen or methanol (in moles per cycle) fed in the regeneration gas, and the number of moles of reducing agent (hydrogen or methanol) fed for each mole of $SO_2$ desorbed.

The above Table VI shows that results with methanol-steam mixtures as the regenerant were fully as good as and perhaps better than those obtained with hydrogen-steam mixtures as the regenerant. Percentage sulfations in the cycles using methanol-steam were comparable to percentage sulfations in the cycles using hydrogen-steam, and the percentage breakthroughs of $SO_2$ into the effluent flue gas were lower. If all cycles had been stopped when the percentage breakthrough of $SO_2$ was 10 percent, the percentage sulfations would have been distinctly better in the cycles using methanol-steam.

Neither percentage of methanol in the regeneration gas nor regeneration space velocity has been optimized in the runs in Table VI. The cycles shown in Table VI were selected in order to show the most nearly comparable conditions for hydrogen-steam and methanol-steam regeneration.

What is claimed is:

1. In a process for removing $SO_2$ from a gas mixture in which said gas mixture is contacted under oxidizing conditions with a solid sorbent which is selective for the removal of $SO_2$ and in which said sorbent is regenerated with a reducing gas, the improvement wherein said reducing gas comprises an alcohol having from 1 to about 6 carbon atoms and wherein said sorbent is contacted with said alcohol at a temperature within the range of about 600° to about 1,000°F.

2. The improvement of claim 1 wherein said solid sorbent comprises copper oxide on alumina.

3. The improvement of claim 1 wherein said reducing gas also comprises steam.

4. The improvement of claim 1 wherein said reducing gas is methanol.

5. The improvement of claim 1 wherein said reducing gas is a mixture of methanol and steam.

6. A process for removing $SO_2$ from a gas mixture containing the same which comprises:
   a. contacting said gas mixture under oxidizing conditions and at a gas inlet temperature of about 600°–1,000°F. with a solid sorbent which is selective for the removal of $SO_2$; and

TABLE VI

| | Sulfation | | Regeneration | | | |
|---|---|---|---|---|---|---|
| Cycle | % $SO_2$ in Effluent | % Sulfation | Reducing Gas | Time, min. | Mols Fed | Mols fed Mol $SO_2$ |
| 618 | 11.2 | 36.6 | Hydrogen | 4 | 0.47 | 3.90 |
| 619 | 10.9 | 36.8 | Hydrogen | 4 | 0.74 | 3.90 |
| 620 | 11.1 | 36.7 | Hydrogen | 4 | 0.74 | 3.89 |
| 621 | 11.4 | 36.5 | Hydrogen | 4 | 0.74 | 3.91 |
| 622 | 11.3 | 36.6 | Hydrogen | 4 | 0.74 | 3.91 |
| 623 | 11.4 | 36.5 | Hydrogen | 4 | 0.74 | 3.91 |
| 624 | 11.4 | 36.5 | Hydrogen | 4 | 0.74 | 3.92 |
| 625 | 11.5 | 36.5 | Hydrogen | 4 | 0.74 | 3.93 |
| 626 | 11.2 | 36.6 | Hydrogen | 4 | 0.74 | 3.91 |
| 627 | 11.9 | 36.3 | Hydrogen | 4 | 0.74 | 3.95 |
| 628 | 11.5 | 36.5 | Hydrogen | 4 | 0.74 | 9.94 |
| 629 | 11.3 | 36.6 | Hydrogen | 4 | 0.74 | 3.93 |
| 630 | 11.6 | 36.5 | Hydrogen | 4 | 0.74 | 3.92 |
| 631 | 11.3 | 36.6 | Hydrogen | 4 | 0.74 | 3.92 |
| 632 | 11.8 | 36.4 | Hydrogen | 4 | 0.74 | 3.94 |
| 646 | 11.8 | 36.4 | Methanol | 3 | 0.56 | 2.99 |
| 647 | 10.0 | 37.1 | Methanol | 3 | 0.56 | 2.93 |
| 648 | 10.5 | 36.9 | Methanol | 3 | 0.56 | 2.96 |
| 649 | 10.8 | 36.8 | Methanol | 3 | 0.56 | 2.96 |
| 650 | 11.0 | 36.7 | Methanol | 3 | 0.56 | 2.97 |
| 651 | 11.3 | 36.6 | Methanol | 3 | 0.56 | 2.98 |
| 652 | 10.8 | 36.8 | Methanol | 3 | 0.56 | 2.97 |
| 653 | 10.9 | 36.8 | Methanol | 3 | 0.56 | 2.97 |
| 654 | 10.4 | 36.9 | Methanol | 3 | 0.56 | 2.95 |
| 655 | — | — | Methanol | 3 | 0.56 | — |
| 656 | 10.8 | 36.8 | Methanol | 3 | 0.56 | 2.96 |
| 657 | 11.5 | 36.5 | Methanol | 3 | 0.56 | 2.98 | b. regenerating said sorbent with a reducing gas comprising one or more alcohols having from 1 to six carbon atoms at a temperature of about 600°F. to about 1,000°F.

7. A process according to claim 6 in which said solid sorbent comprises copper oxide on alumina.

8. A process according to claim 6 in which said reducing gas is methanol.

9. The process of claim 6 wherein said reducing gas is a mixture of methanol and steam.

* * * * *